United States Patent
Kaposi et al.

(10) Patent No.: US 7,055,247 B2
(45) Date of Patent: Jun. 6, 2006

(54) AVOCADO SLICER

(75) Inventors: Sascha Kaposi, Tacoma, WA (US); Kwok Kuen So, Kwoloon (HK)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 10/893,405

(22) Filed: Jul. 15, 2004

(65) Prior Publication Data

US 2006/0010691 A1   Jan. 19, 2006

(51) Int. Cl.
*A47J 17/00* (2006.01)
*A47J 25/00* (2006.01)

(52) U.S. Cl. .............................. 30/114; 30/117; 30/302; 30/303

(58) Field of Classification Search ................. 30/114, 30/117, 302, 303, 279.2, 279.4, 279.6, 280; 99/541
See application file for complete search history.

(56) References Cited

U.S. PATENT DOCUMENTS

| | | | | |
|---|---|---|---|---|
| 2,912,757 A * | 11/1959 | Knight | ........................ | 30/303 |
| 4,383,367 A * | 5/1983 | Mielnicki | ..................... | 30/114 |
| 4,970,786 A * | 11/1990 | Harper | ....................... | 30/123.7 |
| 5,115,565 A * | 5/1992 | Narlock et al. | ............ | 30/123.6 |
| 5,533,442 A * | 7/1996 | Tateno | .......................... | 99/541 |
| 5,613,431 A * | 3/1997 | Tateno | .......................... | 99/541 |
| 5,983,505 A * | 11/1999 | Gibson | ......................... | 30/282 |
| D488,360 S * | 4/2004 | Young | ......................... | D7/693 |
| 6,796,032 B1* | 9/2004 | Horng | ........................... | 30/114 |
| D507,726 S * | 7/2005 | Holcomb et al. | ............ | D7/693 |

* cited by examiner

*Primary Examiner*—Hwei-Siu C. Payer
(74) *Attorney, Agent, or Firm*—Black Lowe & Graham, PLLC

(57) ABSTRACT

An avocado slicer having a handle, a curved blade, and a plurality of internal cutting blades. The blade separates the meat of the avocado from the peel while the internal cutting blades simultaneously slice the meat into separate slices. In a preferred form, the avocado slicer includes an adapter with an integrally formed internal handle, all constructed from plastic. The adapter includes internal ribs and channels configured to receive and firmly retain the base of the blade. A santoprene outer handle is over-molded onto the internal handle to provide a non-slip grip.

13 Claims, 5 Drawing Sheets

AVOCADO SLICER

FIELD OF THE INVENTION

This invention relates generally to kitchen tools, and more particularly devices for slicing avocados.

BACKGROUND OF THE INVENTION

For several years, avocado slicers have been a popular kitchen tool. Examples of such avocado slicers are described in U.S. Pat. Nos. 5,613,431 and 5,533,442, both of which are issued to Tateno. The existing avocado slicers can be improved in a number of areas, however, particularly including the manner in which the slicing blade is attached to the handle.

SUMMARY OF THE INVENTION

The present invention comprises an avocado slicer having a handle, a curved blade, and a plurality of internal cutting blades. The blade separates the meat of the avocado from the peel while the internal cutting blades simultaneously slice the meat into separate slices. In a preferred form, the avocado slicer includes an adapter with an integrally formed internal handle, all constructed from plastic. The adapter includes internal ribs and channels configured to receive and firmly retain the base of the blade. A SANTOPRENE outer handle is over-molded onto the internal handle to provide a non-slip grip.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
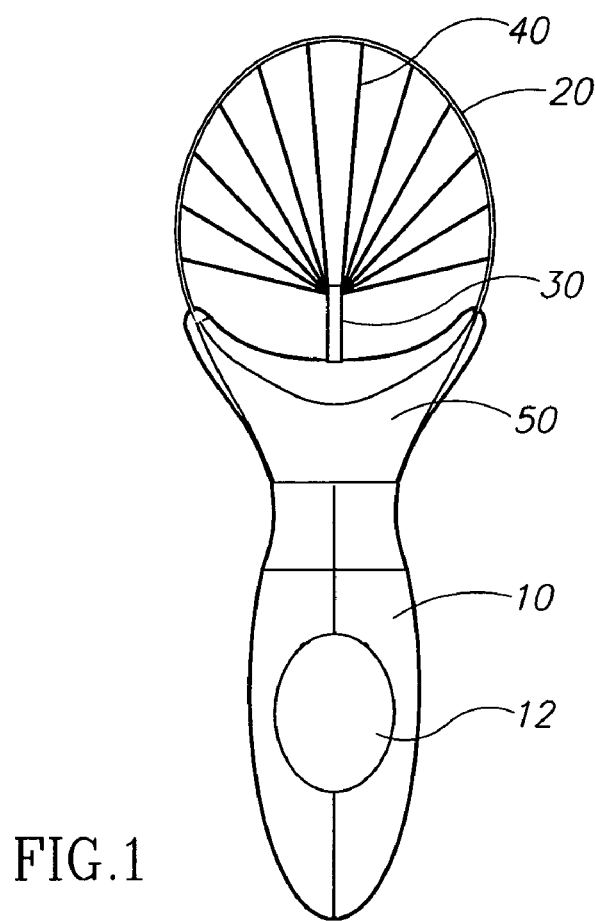
FIG. 1 is a front plan view of a preferred avocado slicer.
Figure 2:
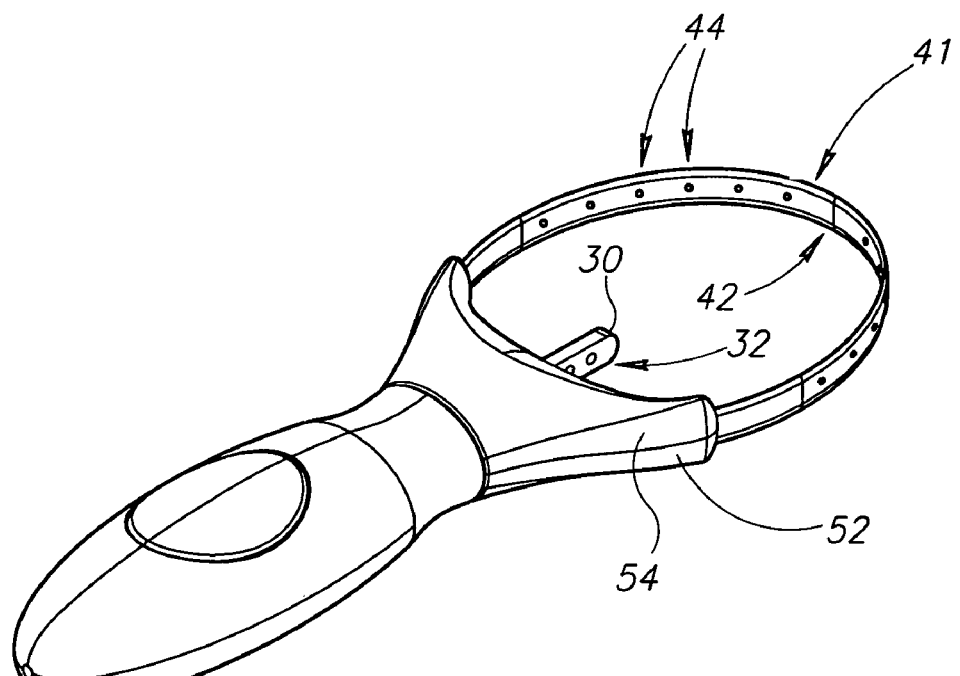
FIG. 2 is a perspective view of a preferred avocado slicer.

FIGS. 1 and 2 illustrate a preferred avocado slicer, in front plan and perspective views. The preferred slicer includes a handle 10, optionally including an emblem 12 formed from metal. The handle is preferably formed from santoprene to provide a soft, non-slip grip.

A blade 20 is curved into a generally oval shape at its working end and defining an internal region within the oval. The blade is preferably formed from metal, but may alternatively be made from plastic or other materials. The outer edges of the blade 41, 42 are each sharpened to facilitate cutting.

A stem 30 extends away from the handle and toward the blade 20. The stem is preferably made from plastic or metal and includes one or more holes 32. A plurality of internal cutting blades 40 are attached to the stem and to radially-spaced locations along the curved blade 20, forming wedge-shaped sections between internal cutting blades. In the preferred form, the internal cutting blades 40 are produced by threading one or more metal wires through the holes 32 in the stem 30 and also through the plurality of holes 44 in the curved blade. In alternative forms, the internal cutting blades may be formed as planar metal or plastic blades that are integrally formed, bonded, welded, or otherwise attached to the blade 20. In some of these alternate forms, the stem 30 may be unnecessary.

The internal cutting blades are only depicted in FIG. 1, and excluded from the other figures so that the other features are more readily visible. Likewise, the curved blade 20 is only partially visible in FIGS. 1 and 2, with a base of the blade being received within an adapter 50. The adapter 50 is made from rigid plastic and securely holds the base of the blade, as discussed further below.

Figure 3:
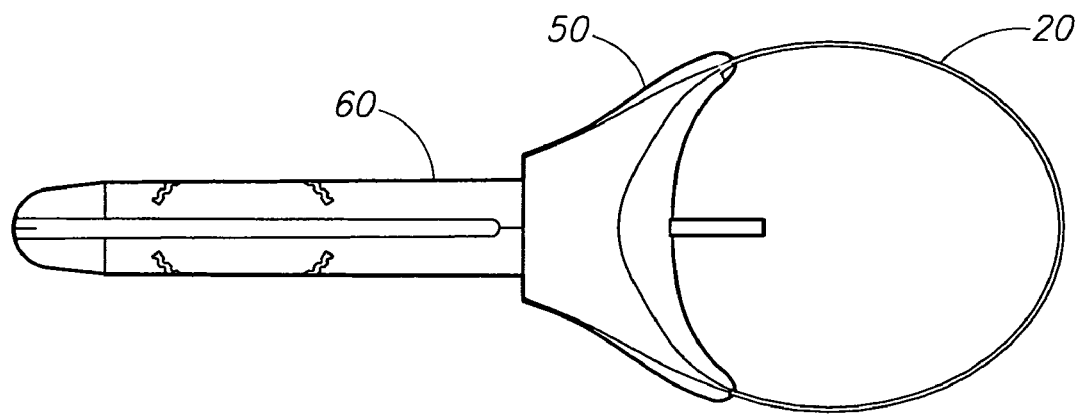
FIG. 3 is a front plan view of a preferred avocado slicer, with the outer handle removed.
Figure 4:
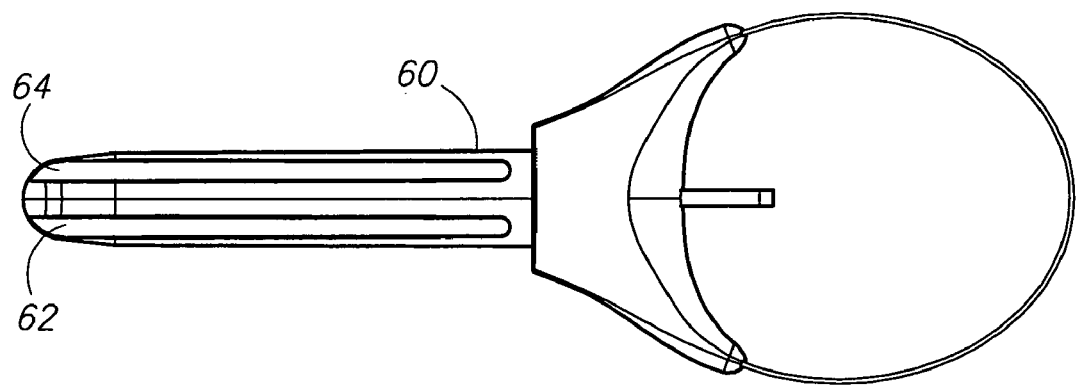
FIG. 4 is a back plan view of a preferred avocado slicer, with the outer handle removed.
Figure 5:
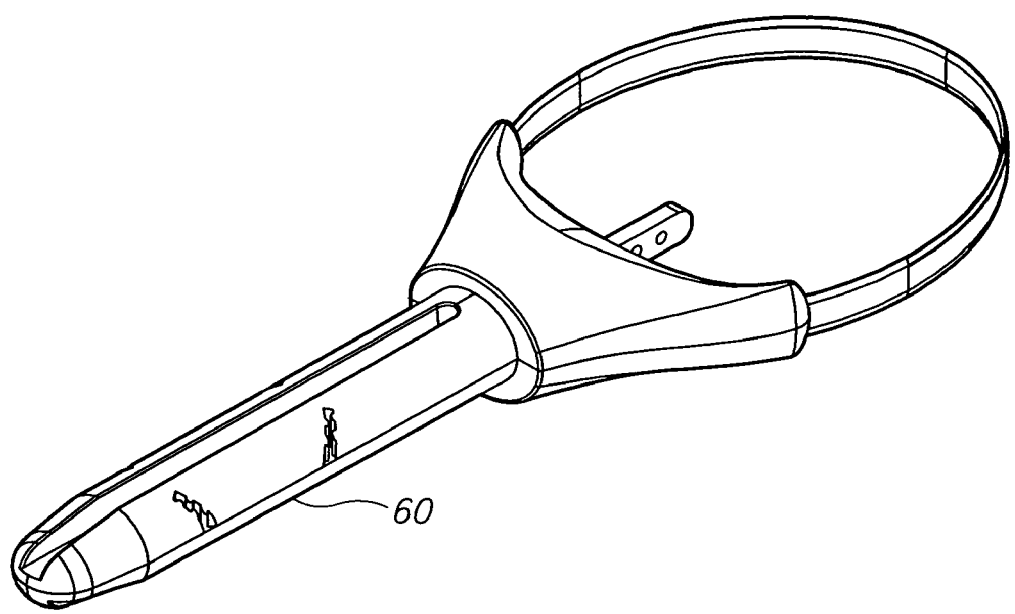
FIG. 5 is a perspective view of a preferred avocado slicer, with the outer handle removed.

FIGS. 3–5 depict the avocado slicer without the external handle 10. An inner handle 60 extends away from the blade 20 and is integrally formed with the bottom section 52 of the adapter 50. In alternate forms, the handle may be secured to the adapter via adhesives, threaded fasteners, or other means. The inner handle 60 includes a number of channels 62–64 to aid in securing the outer handle 10 to the inner handle 60. In the preferred form, the outer handle 10 is press-fit onto the inner handle 60. Thus, the inner handle 60 provides rigidity to the handle, while the outer handle 10 provides an improved grip.

Figure 6:
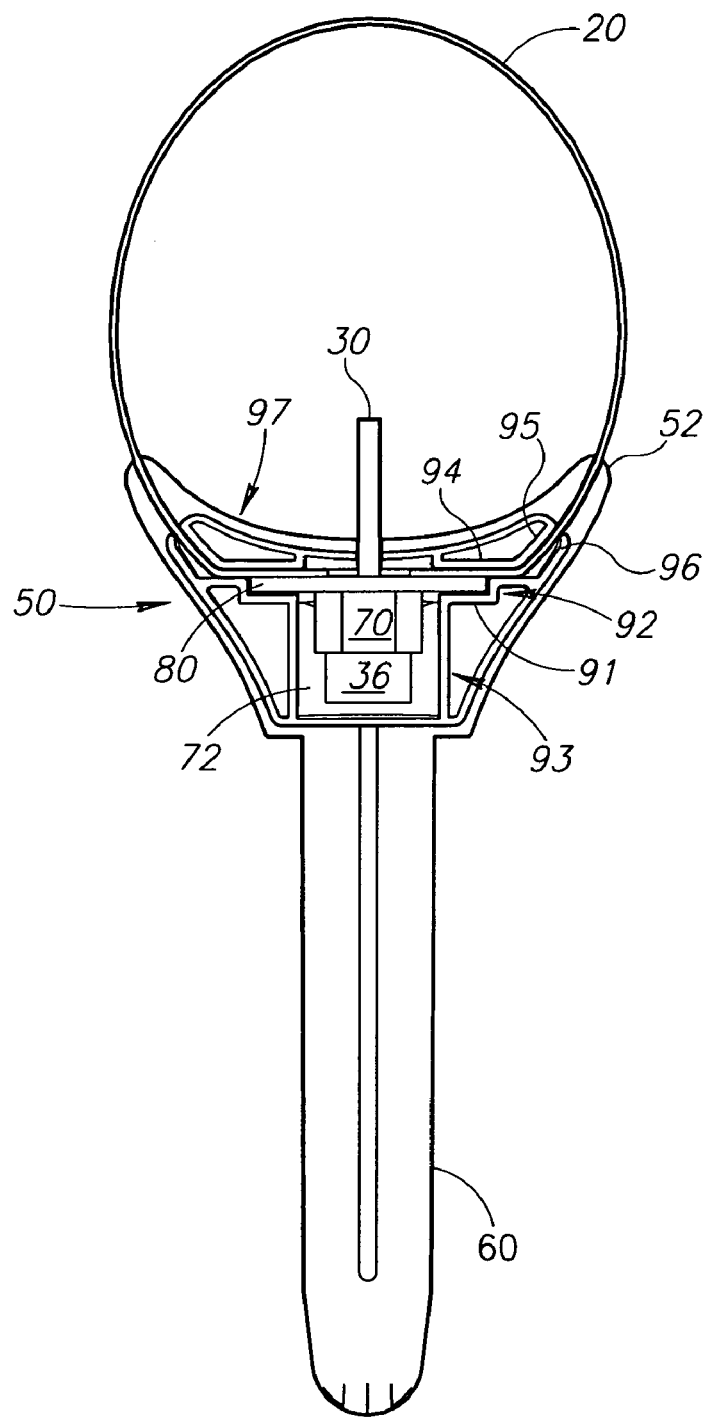
FIG. 6 is a front plan view of a preferred avocado slicer.

FIG. 6 illustrates the internal construction of the adapter 50, particularly the bottom section 52. As seen in FIG. 6, the bottom section 52 of the adapter is integrally formed with the inner handle 60.

The stem 30 extends through a hole in a rigid plate 80, with the plate preferably made from metal. The plate includes a first or lower side, a second or upper side, a first end, and a second end. The stem 30 includes at its base 36 a plurality of steps, forming a one-way ratchet for tightening the internal cutting blades, as described further below and best seen in FIG. 7. To form the blade and internal cutting blade portion of the slicer, the plate 80 is spot-welded to the blade 20. The stem 30 is then inserted through the hole or bore in the plate 80, with the shape of the hole preferably closely matching the cross-sectional shape of the stem 30. The metal wire is then fed through the holes 32 in the stem and the holes 44 around the blade, and tied off at the lower of the two holes 32 on the stem 30. A covering or sleeve (not shown) can optionally be placed around the stem to enclose any loose wire end and provide a more aesthetic appearance. The hex nut 70 is turned to urge the lower end of the stem away from the plate to tighten the wire internal cutting blades 40, and the blade assembly is ready for attachment to the adapter.

The adapter includes a number of ribs defining channels to securely retain the blade assembly. On a first side of the adapter is a first rib assembly comprising a first rib or horizontal seat 91 transitioning to a second rib or vertical shoulder 92 on one side and a vertical wall 93 on the other. A first side of the plate 80 rests against the seat 91 and is restricted against lateral movement by the shoulder 92. A similar rib assembly comprising a seat, shoulder, and vertical wall is provided on a second side of the adapter. The area between opposing vertical walls 93 defines a cavity 72 for receiving the hex nut 70 and lower end 36 of the stem 30.

A third rib is defined by a horizontal section 94 transitioning to a curved section 95. A channel is defined between the horizontal section 94 of the third rib and the first rib or seat 91 to snugly retain the metal plate 80. An additional channel is defined between the curved rib 95 and an opposing rib 96 in order to retain a lower portion of the blade 20. The adapter 50 thereby encapsulates the metal plate 80, lower portion of the stem 30, and a lower portion of the blade 20. Preferably, the adapter includes an upper edge 97 that is curved to approximately produce an oval shape defined by the inner portion of the blade 20 and the curved edge 97.

Once the blade assembly is inserted into the lower portion of the adapter 50, the upper portion 54 is attached to cover the internal assemblies (see FIG. 2). In the preferred embodiment, the upper and lower portions 52, 54 are permanently secured to one another using an adhesive or other methods. It may, however, be removably attached.

Figure 7:
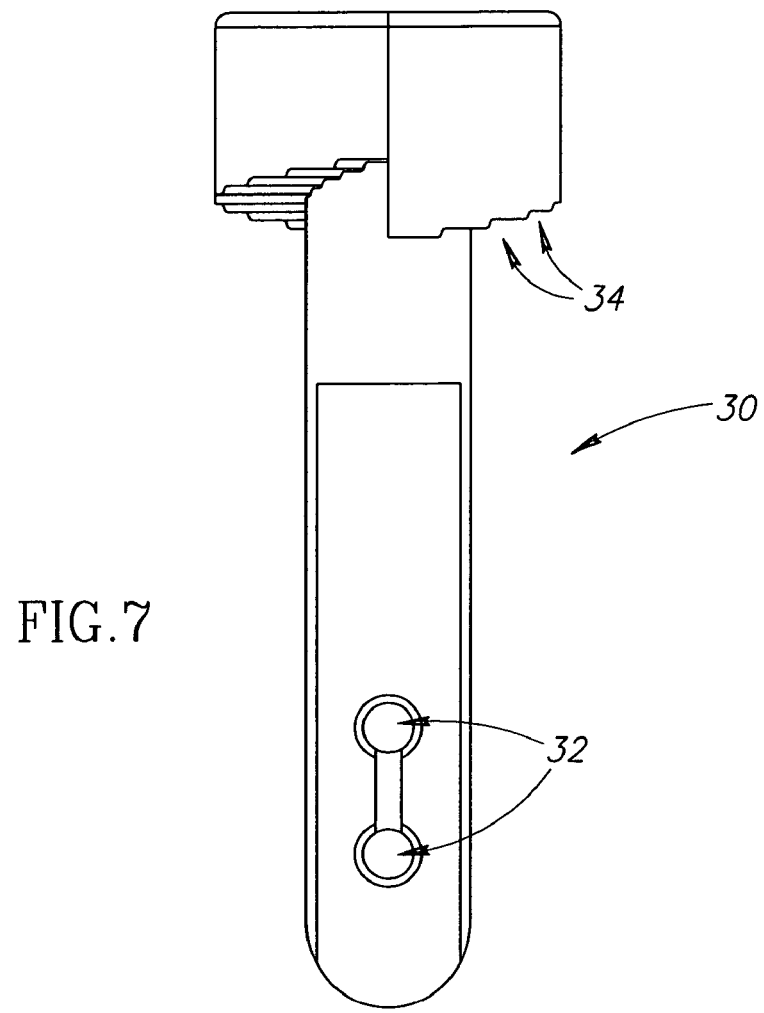
FIG. 7 is a front plan view of a preferred stem.
Figure 8:
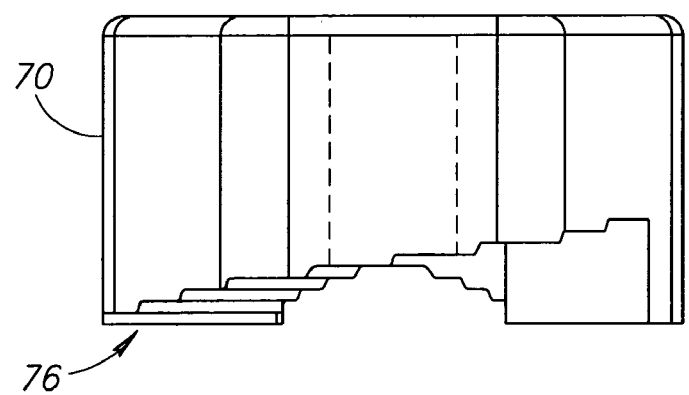
FIG. 8 is a side plan view of a preferred hex nut.

The preferred hex nut and lower stem construction is illustrated in FIGS. 7 and 8. The assembly principally serves to permanently tighten the internal cutting blades 40 before sealing the assembly within the adapter. The lower end 36 of the stem includes a first face having a plurality of steps 34 forming a stepped ramp around the perimeter of the lower end of the stem 36. In a preferred form, twenty steps 34 are provided around the perimeter, with each step having a rise of about 0.3 mm.

The hex nut includes a hexagonal outer perimeter and an internal circular bore. The diameter of the internal bore is made large enough to receive the stem 30 and allow the hex nut 70 to rotate while the stem is within the bore. A first face of the hex nut includes a plurality of steps 76 forming a stepped ramp around the perimeter of the nut. In a preferred form, the steps match those of the lower end of the stem 30, so that twenty steps 76 are provided around the perimeter, with each step having a rise of about 0.3 mm.

When assembling the avocado slicer, the stem 30 is inserted through the bore in the hex nut 70, so that the stepped ramps of the hex nut and lower end of the stem 36 face one another. In the preferred form, the upper end of the stem 30 (that is, the portion projecting though the metal plate 80) is rectangular or square in cross-section, the corresponding rectangular or square-shaped hole within the metal plate 80 will prevent the stem from rotating. By rotating the hex nut 70, the lower end of the stem 36 will be pushed in a direction away from the blade, pulling the wires tighter. The step arrangement serves as a one-way ratchet, so that the wire can be initially tightened but cannot be loosened again.

In an alternate embodiment, the hex nut and ratchet assembly may be replaced by an alternate construction that serves as a one-way ratchet to permanently tighten the stem and internal cutting blades. A one-way system is preferred, so that the internal cutting blades can be tightened at the time of production and will not loosen as the tool is used. In alternate embodiments, yet other constructions are possible, including a threaded hex nut and mating threads on the lower end of the stem 32, such that turning the hex nut forces the lower end of the stem away from the blade, thereby tightening the internal cutting blades.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A tool for slicing avocados, comprising:
   a curved blade defining an internal region, the curved blade having a base;
   a plate having first and second ends, the plate being elongated between the first and second ends, the first and second ends attached to the base of the curved blade;
   a plurality of internal cutting blades attached to the curved blade;
   a handle; and
   an adapter attached to the handle and the plate and surrounding the first and second ends of the plate and the base of the curved blade to secure the curved blade to the handle.

2. The tool of claim 1, wherein the plate comprises a bore, and the tool further comprises a stem having an upper end, and a lower end, the upper end of the stem passing through the bore, the upper end of the stem further being attached to the plurality of internal blades.

3. The tool of claim 2, further comprising a hex nut surrounding the stem and located between the lower end of the stem and the plate, wherein rotation of the hex nut will urge the lower end of the stem away from the plate to tighten the internal blades.

4. The tool of claim 3, wherein the hex nut further comprises a first face adjacent the lower end of the stem, the first face of the hex nut having a plurality of steps positioned radially around the first face of the hex nut.

5. The tool of claim 4, wherein the lower end of the stem further comprises a first face adjacent the hex nut, the first face of the lower end of the stem having a plurality of steps positioned radially around the first face of the lower end of the stem.

6. The tool of claim 1, wherein the adapter comprises a channel configured to snugly receive the base of the curved blade, the plate attached to the base of the curved blade, and wherein the channel snugly receives the plate.

7. The tool of claim 6, wherein the channel is defined by a plurality of ribs.

8. The tool of claim 7, wherein the plate has a first side, a second side, a first end, and a second end, and further wherein the plurality of ribs comprises a first rib in contact with the first side of the plate and a second rib substantially orthogonal to the first rib and in contact with a first end of the plate.

9. The tool of claim 8, wherein the plurality of ribs further comprises a third curved rib in contact with the base of the curved blade.

10. The tool of claim 9, wherein the channel comprises an upper portion and a lower portion permanently attached to the upper portion.

11. A tool for slicing avocados, comprising:
    a curved blade having first and second ends, the blade defining an internal region;
    a cross member having first and second ends, the first and second ends of the cross member extending between and being secured to, respectively, the first and second ends of the curved blade;
    a plurality of internal cutting blades attached to the curved blade and being positioned within the internal region;
    a handle; and
    an adapter formed on the handle, the first and second ends of the curved blade and the first and second ends of the cross member being retained within the adapter.

12. The tool of claim 11, wherein the first and second ends of the curved blade insert into opposite sides of the adapter.

13. The tool of claim 11, wherein the cross member is a plate.

* * * * *